United States Patent
Deleplanque et al.

(10) Patent No.: US 12,306,061 B2
(45) Date of Patent: May 20, 2025

(54) METHOD FOR MONITORING THE BALANCING OF THE WHEELS OF A MOTOR VEHICLE

(71) Applicant: Continental Automotive Technologies GmbH, Hannover (DE)

(72) Inventors: Fabien Deleplanque, Toulouse (FR); Xavier Rolland, Toulouse (FR); Nicolas Guinart, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/708,076

(22) PCT Filed: Nov. 9, 2022

(86) PCT No.: PCT/EP2022/081240
§ 371 (c)(1),
(2) Date: May 7, 2024

(87) PCT Pub. No.: WO2023/083854
PCT Pub. Date: Sep. 19, 2023

(65) Prior Publication Data
US 2025/0110005 A1 Apr. 3, 2025

(30) Foreign Application Priority Data
Nov. 15, 2021 (FR) ........................ 2112066

(51) Int. Cl.
*G01M 1/28* (2006.01)
(52) U.S. Cl.
CPC .................... *G01M 1/28* (2013.01)
(58) Field of Classification Search
CPC ........................................................ G01M 1/28
See application file for complete search history.

(56) References Cited

U.S. PATENT DOCUMENTS

| 8,576,121 B2 | 11/2013 | Guinart | |
|---|---|---|---|
| 2003/0006893 A1* | 1/2003 | Dunbridge | G01M 17/04 340/444 |

(Continued)

FOREIGN PATENT DOCUMENTS

| EP | 1281950 A2 | 2/2003 |
|---|---|---|
| EP | 3002576 A1 | 4/2016 |

(Continued)

OTHER PUBLICATIONS

International Search Report (PCT/ISA/210) with translation and Written Opinion (PCT/ISA/237) mailed on Feb. 27, 2023 by the European Patent Office as the International Searching Authority for International Application No. PCT/EP2022/081240. (14 pages).

(Continued)

*Primary Examiner* — Adam R Mott
*Assistant Examiner* — Sagar Kc
(74) *Attorney, Agent, or Firm* — Buchanan Ingersoll & Rooney PC

(57) ABSTRACT

A method for monitoring the balancing of the wheels of a motor vehicle, comprising at least a phase of modeling a first sinusoidal theoretical acceleration signal of a first wheel and a second sinusoidal theoretical acceleration signal of a second wheel, a noise-measuring phase including, for the first wheel, calculating the difference between the value of each sample of the first raw acceleration signal and a corresponding theoretical value of the first theoretical acceleration signal, then measuring a first standard deviation for the calculated differences, and, for the second wheel, calculating the difference between the value of each sample of the second raw acceleration signal and a corresponding theoretical value of the second theoretical acceleration signal, then measuring a second standard deviation for the calculated differences, a first step of calculating reference (Continued)

averages including calculating a first reference average of the first standard deviations and a second reference average of the second standard deviations, a second step of calculating a first current average of the first standard deviations and a second current average of the second standard deviations, and a diagnostic step to calculate a first variation between the first current average and the first reference average and a second variation between the second current average and the second reference average in order to detect a possible relative unbalance of the wheels.

11 Claims, 3 Drawing Sheets

(56) References Cited

U.S. PATENT DOCUMENTS

2018/0003593 A1* 1/2018 Siegel .................. B60C 11/246
2019/0064027 A1* 2/2019 Leone .................. G07C 5/0841

FOREIGN PATENT DOCUMENTS

| EP | 3637078 A1 | 4/2020 |
|----|-----------|--------|
| EP | 3250424 B1 | 9/2020 |
| FR | 2948189 B1 | 7/2011 |

OTHER PUBLICATIONS

Preliminary Search Report and Written Opinion dated Jun. 21, 2022 with machine translation issued by the French Patent Office in corresponding French Application No. FR2112066. (15 pages).

Sturmhoebel, Jörg, "Loose Wheel Indicator-in less than a minute", NIRA Dynamics AB (date unknown). (4 pages).

English translation of the Written Opinion of the International Searching Authority (Form PCT/ISA/237) issued Feb. 27, 2023, by the European Patent Office in corresponding International Application No. PCT/EP2022/081240. (6 pages).

* cited by examiner

METHOD FOR MONITORING THE BALANCING OF THE WHEELS OF A MOTOR VEHICLE

CROSS REFERENCE TO RELATED APPLICATIONS

This application is the U.S. National Phase Application of PCT International Application No. PCT/EP2022/081240, filed Nov. 9, 2022, which claims priority to French Patent Application No. 2112066, filed Nov. 15, 2021, the contents of such applications being incorporated by reference herein.

FIELD OF THE INVENTION

The present patent application relates to a method for monitoring the balancing of the wheels of a motor vehicle, this method having applications notably in the field of tire monitoring systems for motor vehicles.

BACKGROUND OF THE INVENTION

For safety purposes, it is known practice to fit a motor vehicle with a monitoring system known by the abbreviation TPMS (tire pressure monitoring system).

Such a monitoring system generally comprises a central processing unit, wheel units, each of which equips an associated wheel of the vehicle, and a radiofrequency communication assembly that is designed to ensure communication between each wheel unit and the central processing unit.

The central unit comprises an electronic computer known by the abbreviation ECU (electronic control unit).

Each wheel unit comprises an electronic assembly of sensors in order in particular to detect an anomaly with the wheel. These sensors may, for example, be a tire inflation pressure sensor, a temperature sensor and a wheel acceleration sensor.

In addition, each wheel unit comprises a battery and a memory.

Still for safety purposes, a method that aims to detect a loose wheel on the basis of a wheel speed signal, such as the method described in the document EP3250424B1, is also known.

The existing prior art, in particular the method described in the document EP3250424B1, incorporated herein by reference, does not make it possible to detect an unbalanced wheel, that is to say a wheel that is correctly fixed to the vehicle, but the weight of which is unevenly distributed about the axis of rotation, for example.

Furthermore, the method described in the document EP3250424B1 requires the use of a speed sensor to establish a wheel speed signal.

SUMMARY OF THE INVENTION

The aspect of the present invention is in particular to overcome the drawbacks of the aforementioned prior art by proposing a method for monitoring unbalance that is based on data supplied by the accelerometer of the wheel units of the TPMS system of the motor vehicle.

This aspect, and others that will become apparent from reading the following description, is achieved by a method for monitoring the balancing of the wheels of a motor vehicle, said motor vehicle comprising at least:

a first wheel unit that is mounted on an associated first wheel of the motor vehicle and that comprises a first computer and a first accelerometer, the first wheel unit being designed to supply a first raw acceleration signal based on a plurality of first samples of radial acceleration values of the first wheel, and a second wheel unit that is mounted on an associated second wheel of the motor vehicle and that comprises a second computer and a second accelerometer, the second wheel unit being designed to supply a second raw acceleration signal based on a plurality of second samples of radial acceleration values of the second wheel, characterized in that it comprises at least:

a step of measuring noise that comprises at least:

a modeling phase that consists of modeling a first sinusoidal theoretical acceleration signal of the first wheel and a second sinusoidal theoretical acceleration signal of the second wheel, a noise-measuring phase that consists, for the first wheel, of calculating the difference between the value of each sample of the first raw acceleration signal and a corresponding theoretical value of the first theoretical acceleration signal, then of measuring a first standard deviation for the calculated differences, and, for the second wheel, of calculating the difference between the value of each sample of the second raw acceleration signal and a corresponding theoretical value of the second theoretical acceleration signal, then of measuring a second standard deviation for the calculated differences, a first step of calculating reference averages that is carried out following a repetition of the noise-measuring step in order to obtain a minimum number of first standard deviations and of second standard deviations and that consists of calculating a first reference average of said first standard deviations and a second reference average of said second standard deviations, a second step of calculating current averages that is carried out following a repetition of the noise-measuring step in order to obtain a minimum number of first standard deviations and of second standard deviations and that consists of calculating a first current average of said first standard deviations and a second current average of said second standard deviations, and a diagnostic step that aims to calculate a first variation between the first current average and the first reference average and a second variation between the second current average and the second reference average and that aims to analyze said calculated variations in order to detect a possible relative unbalance of said wheels.

According to other optional features of aspects of the invention, taken alone or in combination:

each theoretical acceleration signal of said wheels is modeled during the modeling phase by the following function:

$$f(t)=A(\sin(\omega t+\varphi))$$

where A is a constant that determines the amplitude of the theoretical acceleration signal of the wheel in question, w is the measured angular velocity of the wheel in question such that:

$\omega=2*\pi*f$ and $\varphi$ is the phase of the theoretical acceleration signal of the wheel in question;

the noise-measuring step comprises an adjustment phase that consists of adjusting the phase of the first theoretical acceleration signal to the phase of the first raw acceleration signal and of adjusting the phase of the second theoretical acceleration signal to the phase of the second raw acceleration signal in order to minimize the first standard deviations and the second standard deviations, respectively;

the noise-measuring step comprises a transmission phase, during which the first standard deviation and the second standard deviation are transmitted from the first wheel unit and the second wheel unit, respectively, to a central processing unit that is fitted on the motor vehicle;

the first current average and the second current average are calculated over a minimum number of first standard deviations and of second standard deviations and over a sliding window that encompasses the last standard deviations measured;

the first reference average and the second reference average are calculated over a minimum number of first standard deviations and of second standard deviations;

during the diagnostic step, the first reference average of said first standard deviations and the second reference average of said second standard deviations are each reset and the first step of calculating reference averages is executed again if the following conditions are met:

the first variation involving the first wheel is greater than an upper threshold, and the second variation involving the second wheel is greater than an upper threshold;

during the diagnostic step, if either the first variation involving the first wheel or the second variation involving the second wheel is greater than an upper threshold, and if either the first variation or the second variation is lower than a lower threshold, then a warning signaling an unbalance of the wheel that has exceeded said upper threshold is output;

the upper variation threshold is equal to ten percent and the lower variation threshold is equal to five percent;

the first wheel and the second wheel belong to one and the same axle of the motor vehicle.

An aspect of the invention also relates to a motor vehicle, which comprises at least:

a first wheel unit that is mounted on an associated first wheel of the vehicle and that comprises a first computer and a first accelerometer, the first wheel unit being designed to supply a first raw acceleration signal comprising a plurality of first samples of acceleration values of the first wheel, a second wheel unit that is mounted on an associated second wheel of the vehicle and that comprises a second computer and a second accelerometer, the second wheel unit being designed to supply a second raw acceleration signal comprising a plurality of second samples of acceleration values of the second wheel, and a central unit, characterized in that said central unit and/or said wheel units are suitably programmed to implement the method described above.

BRIEF DESCRIPTION OF THE DRAWINGS

Other features and advantages of aspects of the invention will become apparent on reading the following description, with reference to the appended figures, in which.

In all of these figures, identical or similar elements are denoted by identical or similar reference signs.

DETAILED DESCRIPTION OF EXEMPLARY EMBODIMENTS

Figure 1:
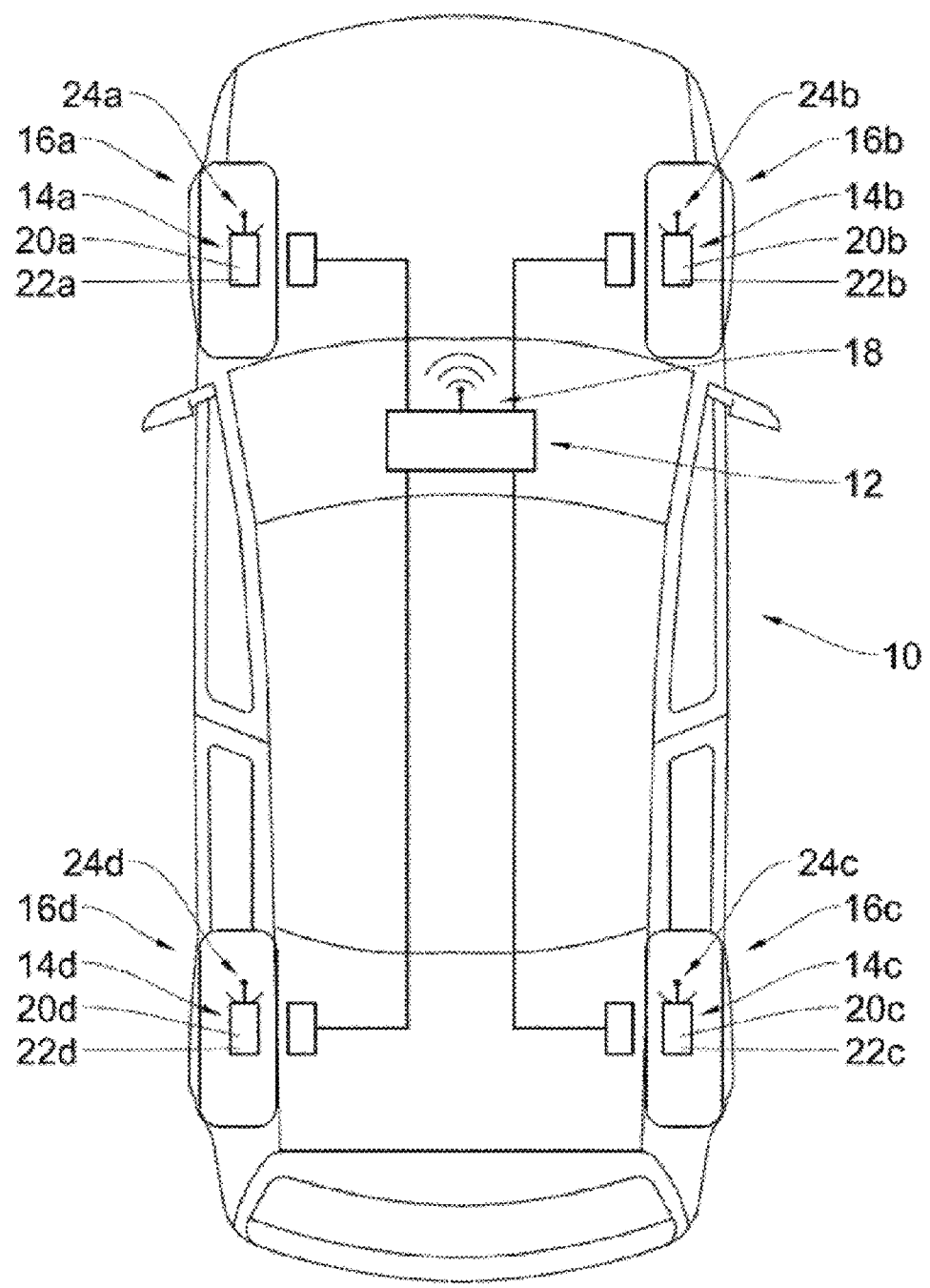
FIG. 1 illustrates a schematic plan view of a motor vehicle equipped with four wheel units and a computer implementing the monitoring method according to an aspect of the invention.

FIG. 1 shows a motor vehicle 10 that is equipped with a central processing unit 12 and four wheel units 14a, 14b, 14c, 14d.

The four wheel units 14a, 14b, 14c, 14d belong to a monitoring system of the TPMS (tire pressure monitoring system) type, and they are each mounted on an associated wheel 16a, 16b, 16c, 16d.

The four wheels 16a, 16b, 16c, 16d comprise a front left wheel, denoted 16a, and a front right wheel, denoted 16b, which are arranged on a front axle, and a rear right wheel, denoted 16c, and a rear left wheel, denoted 16d, which are arranged on a rear axle of the motor vehicle 10.

The central unit 12 comprises in particular an electronic computer known by the abbreviation ECU (electronic control unit), and a memory.

The central unit 12 also comprises a main radiofrequency transceiver 18.

Each wheel unit 14a, 14b, 14c, 14d comprises an electronic box that contains a set of sensors dedicated to measuring parameters, in particular an accelerometer 20a, 20b, 20c, 20d, a pressure sensor and a temperature sensor.

Each accelerometer 20a, 20b, 20c, 20d is designed to supply radial acceleration values of the associated wheel 16a, 16b, 16c, 16d.

Each wheel unit 14a, 14b, 14c, 14d also comprises a computer 22a, 22b, 22c, 22d, a battery and a memory (not shown).

Furthermore, each wheel unit 14a, 14b, 14c, 14d is equipped with a secondary transceiver 24a, 24b, 24c, 24d that is designed to communicate and transmit messages with the central unit 12 via the main transceiver 18.

The messages exchanged between the central unit 12 and each wheel unit 14a, 14b, 14c, 14d comprise in particular data representative of operating parameters of each associated wheel 16a, 16b, 16c, 16d and an identification code for each associated wheel unit 14a, 14b, 14c, 14d.

So as to avoid making the description needlessly cumbersome, the remainder of the description of an aspect of the invention will be limited to the two wheels of the front axle, that is to say the first wheel 16a with the associated first wheel unit 14a and the second wheel 16b with the associated second wheel unit 14b.

It will be noted that an aspect of the invention applies in the same way to the two wheels 16c, 16d of the rear axle.

Overall, the method for monitoring the balancing of the wheels according to an aspect of the invention aims to measure the noise of the raw acceleration signal of the two wheels of one and the same axle, and to compare the variation of the measured noise of the two wheel units to detect a possible unbalance of a wheel.

Figure 3:
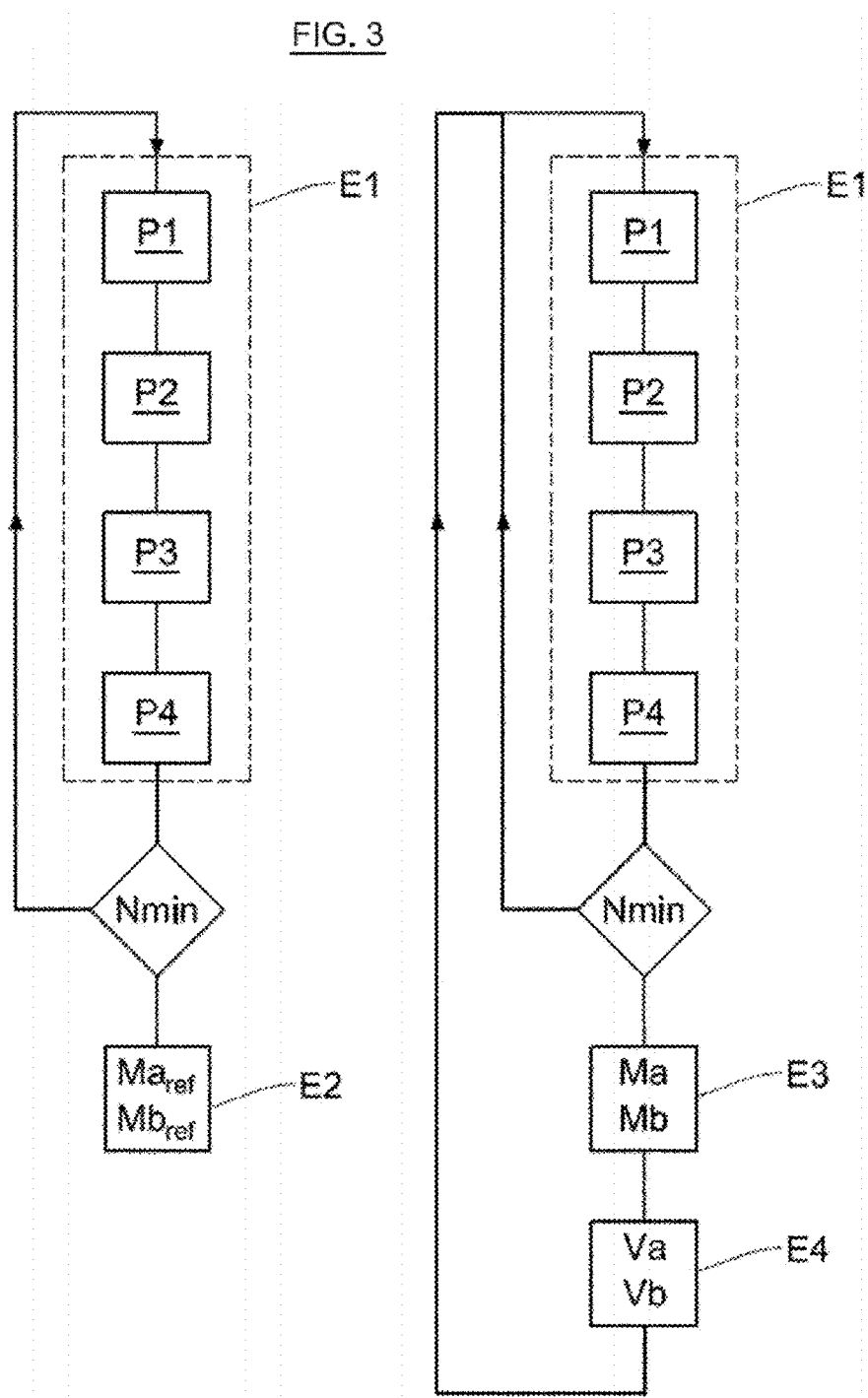
FIG. 3 illustrates a diagram representing the sequence of the steps of the method according to an aspect of the invention.

To this end, with reference to FIG. 3, the method according to an aspect of the invention comprises a step E1 of measuring noise that comprises, in succession, a phase P1 of modeling a first sinusoidal theoretical acceleration signal $Sa_{th}(t)$ of the first wheel 16*a* and a second sinusoidal theoretical acceleration signal $Sb_{th}(t)$ of the second wheel 16*b*, a noise-measuring phase P2, a phase P3 of adjusting signal phases and a phase P4 of transmitting data.

Figure 2:
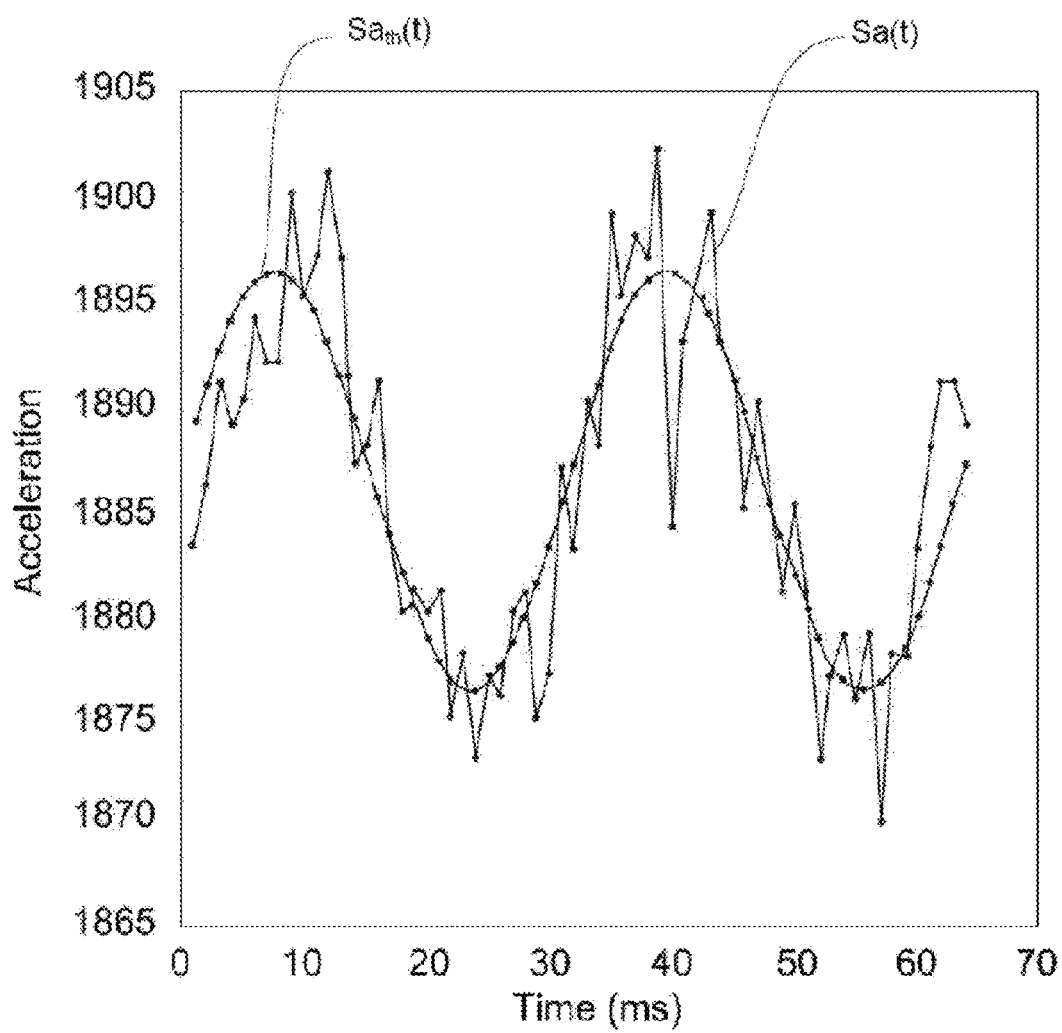
FIG. 2 illustrates a graph with a radial acceleration value on the ordinate and the time expressed in milliseconds on the abscissa, representing the first theoretical acceleration signal of the first wheel.

FIG. 2 shows a graph with a radial acceleration value on the ordinate and the time expressed in milliseconds on the abscissa, which illustrates the first theoretical acceleration signal $Sa_{th}(t)$ of the associated wheel 16*a*.

During the modeling phase P1, the theoretical acceleration signal $Sa_{th}(t)$, $Sb_{th}(t)$ of each wheel 16*a*, 16*b* is modeled by the following function:

$$f(t)=A(\sin(\omega t+\varphi))$$

where A is a constant that determines the amplitude of the theoretical acceleration signal $Sa_{th}(t)$, $Sb_{th}(t)$ of the wheel 16*a*, 16*b* in question and that depends on the electronic architecture of the associated wheel unit 14*a*, 14*b*, w is the measured angular velocity of the wheel 16*a*, 16*b* in question such that $\omega=2*\pi*f$ and $\varphi$ is the phase of the theoretical acceleration signal $Sa_{th}(t)$, $Sb_{th}(t)$ of the wheel 16*a*, 16*b* in question.

The noise-measuring phase P2 consists, for the first wheel 16*a*, of obtaining a first raw acceleration signal Sa(t) of the first wheel 16*a*, which forms a sinusoid based on sixty-four first samples of radial acceleration values supplied by the associated accelerometer 20*a*, i.e. two wheel revolutions, as can be seen in FIG. 2.

Subsequently, the difference between the value of each sample of the first raw acceleration signal Sa(t) and a corresponding theoretical value of the first theoretical acceleration signal $Sa_{th}(t)$ of the first wheel 16*a* is calculated, and then a first standard deviation for the calculated differences is measured.

"Corresponding theoretical value" is understood to mean the theoretical value that corresponds to the measured value of each sample of the first raw acceleration signal Sa(t), that is to say the theoretical value taken at the same time or the same date as the value of each sample of the first raw acceleration signal Sa(t) to be compared.

Indeed, each value of the first raw acceleration signal Sa(t) is associated with a known time that is a temporal decomposition of two wheel revolutions with thirty-two samples per wheel revolution, according to the example described in this case.

Similarly, the noise-measuring phase P2 consists, for the second wheel 16*b*, of obtaining a second raw acceleration signal Sb (t) of the second wheel 16*b*, which forms a sinusoid based on sixty-four first samples of radial acceleration values supplied by the associated accelerometer 20*b*, i.e. two wheel revolutions, according to the example described in this case.

Subsequently, the difference between the value of each sample of the second raw acceleration signal Sb (t) and a corresponding theoretical value of the second theoretical acceleration signal $Sb_{th}(t)$ of the second wheel 16*b* is calculated, and then a second standard deviation for the calculated differences is measured.

Following the noise-measuring phase P2, the noise-measuring step E1 comprises an adjustment phase P3 that consists of adjusting the phase of the first theoretical acceleration signal $Sa_{th}(t)$ to the phase of the associated first raw acceleration signal Sa(t) so as to minimize the first standard deviation.

Similarly, the adjustment phase P3 consists of adjusting the phase of the second theoretical acceleration signal $Sb_{th}(t)$ to the phase of the associated second raw acceleration signal Sb (t) so as to minimize the second standard deviation.

Finally, following the adjustment phase P3, the noise-measuring step E1 comprises a transmission phase P4, during which the first standard deviation and the second standard deviation are transmitted by radiofrequency from the first wheel unit 14*a* and the second wheel unit 14*b*, respectively, to the central processing unit 12 via the main transceiver 18 and the secondary transceiver 24*a*, 24*b* of each wheel unit 14*a*, 14*b*.

Each standard deviation received by the central unit 12 is stored in a memory.

According to one preferred exemplary embodiment of the invention, the standard deviations are transmitted by the wheel units 14*a*, 14*b* at the same time as other data are transmitted, during a phase of locating the wheel units 14*a*, 14*b*, for example during a running cycle starting phase of the motor vehicle 10 of ten minutes, which represents forty transmissions from each wheel unit 14*a*, 14*b* to the central unit 12.

Furthermore, the method according to an aspect of the invention comprises a first step E2 of calculating reference averages, and a second step E3 of calculating current averages, illustrated in FIG. 3.

The first step E2 of calculating reference averages, which corresponds to a learning phase, consists of calculating a first reference average $Ma_{ref}$ of the first standard deviations and a second reference average $Mb_{ref}$ of the second standard deviations.

The first reference average $Ma_{ref}$ and the second reference average $Mb_{ref}$ are calculated over a minimum number $N_{min}$ of first standard deviations and of second standard deviations, for example a minimum number of four hundred, which corresponds to multiple starts of running cycles of the motor vehicle 10.

For this purpose, the noise-measuring step E1 is repeated multiple times before the first calculating step E2 in order to obtain a sufficient number of first standard deviations and of second standard deviations.

The second step E3 of calculating current averages is similar to the first step E2 of calculating reference averages, but it is calculated over a sliding window that encompasses the last standard deviations transmitted to the central unit 12.

The second calculating step E3 therefore consists of calculating a first current average Ma of the first standard deviations and a second current average Mb of the second standard deviations.

Preferably, the first current average Ma and the second current average Mb are calculated with a minimum number $N_{min}$ of first standard deviations and of second standard deviations, for example the four hundred last standard deviations measured, which corresponds to multiple starts of running cycles of the motor vehicle 10.

For this purpose, the noise-measuring step E1 is repeated multiple times before the second calculating step E3 in order to obtain a sufficient number of first standard deviations and of second standard deviations.

Furthermore, the method according to an aspect of the invention comprises a diagnostic step E4 that aims to detect a possible relative unbalance of the first wheel 16*a* and of the second wheel 16*b*.

To this end, during the diagnostic step E4, a first variation Va between the first current average Ma and the first reference average $Ma_{ref}$ is measured, and a second variation Vb between the second current average Mb and the second reference average $Mb_{ref}$ is measured.

Still during the diagnostic step E4, if either the first variation Va involving the first wheel 16*a* or the second variation Vb involving the second wheel 16*b* is greater than an upper threshold, and if, in the same window, either the first variation Va or the second variation Vb is lower than a lower threshold, this being over a number of consecutive iterations, for example over forty consecutive averages, then a warning signaling an unbalance of the wheel that has exceeded the upper threshold is output.

Indeed, if the current average of the first wheel of an axle varies in relation to the current average of the second wheel of the same axle, beyond a certain threshold, then it is highly probable that the first wheel is unbalanced.

According to one exemplary embodiment, the upper variation threshold is equal to ten percent and the lower variation threshold is equal to five percent.

The choice of values of the upper and lower thresholds determines the sensitivity and the robustness of the monitoring method.

The warning signaling an unbalance may be displayed on the dashboard of the motor vehicle 10 in order to signal to the driver that one of the wheels is unbalanced.

According to another aspect of the invention, the reference averages $Ma_{ref}$, $Mb_{ref}$ are reset during the diagnostic step E4 if the following conditions are met: the first variation Va involving the first wheel 16a is greater than an upper threshold, and the second variation Vb involving the second wheel 16b is greater than an upper threshold, this being over a number of consecutive iterations, for example over forty consecutive averages. According to one exemplary embodiment, the upper variation threshold is equal to ten percent.

These resetting conditions reflect simultaneous noise on the two wheels of the same axle, which is interpreted as a deteriorated road and not as an unbalance of the wheels, in order to avoid an untimely unbalance warning.

Furthermore, certain conditions also lead to the method being reset by the central unit 12, that is to say deletion of the data that comprise the standard deviations, the reference averages $Ma_{ref}$, $Mb_{ref}$ and the current averages Ma, Mb of the wheel units 14a, 14b of the motor vehicle 10.

A first resetting condition is met when the pressure measured in the tire of a wheel is equal to atmospheric pressure, which reflects the tire being changed or repaired.

A second resetting condition is met when a change of location of a wheel is detected.

Finally, a third resetting condition is met when the central unit 12 is reset.

An aspect of the present invention exhibits numerous advantages, in particular the advantage of using the TPMS system previously described, which is inherent to numerous vehicles, without resorting to an additional system.

Furthermore, the method for monitoring the balancing of the wheels according to an aspect of the invention may use the data transmitted by the wheel units, such as the data used for the function of locating the wheels.

The method according to an aspect of the invention therefore consumes little or no additional energy and therefore has little impact on the battery and on its service life.

Another advantage of an aspect of the present invention is to prevent hazardous situations linked to poor balancing of the wheels by alerting the driver to poor balancing.

Finally, an aspect of the present invention makes it possible to quickly remedy poor balancing of the wheels, which makes it possible to improve the wear of the suspension members, steering members and tires, and to reduce driving discomfort due to vibrations caused by an unbalance of the wheels.

Naturally, an aspect of the invention is described in the preceding text by way of example. It is understood that a person skilled in the art is able to produce various variant embodiments of the invention without thereby departing from the scope of the invention.

The invention claimed is:

1. A method for monitoring the balancing of the wheels of a motor vehicle, said motor vehicle comprising:
    a first wheel unit that is mounted on an associated first wheel of the motor vehicle and that comprises a first computer and a first accelerometer, the first wheel unit being designed to supply a first raw acceleration signal based on a plurality of first samples of radial acceleration values of the first wheel, and
    a second wheel unit that is mounted on an associated second wheel of the motor vehicle and that comprises a second computer and a second accelerometer, the second wheel unit being designed to supply a second raw acceleration signal based on a plurality of second samples of radial acceleration values of the second wheel, the method comprising:
    a step of measuring noise that comprises at least:
    a modeling phase that consists of modeling a first sinusoidal theoretical acceleration signal of the first wheel and a second sinusoidal theoretical acceleration signal of the second wheel,
    a noise-measuring phase that consists, for the first wheel, of calculating the difference between the value of each sample of the first raw acceleration signal and a corresponding theoretical value of the first theoretical acceleration signal, then of measuring a first standard deviation for the calculated differences, and, for the second wheel, of calculating the difference between the value of each sample of the second raw acceleration signal and a corresponding theoretical value of the second theoretical acceleration signal, then of measuring a second standard deviation for the calculated differences,
    a first step of calculating reference averages that is carried out following a repetition of the noise-measuring step in order to obtain a minimum number of first standard deviations and of second standard deviations and that consists of calculating a first reference average of said first standard deviations and a second reference average of said second standard deviations,
    a second step of calculating current averages that is carried out following a repetition of the noise-measuring step in order to obtain a minimum number of first standard deviations and of second standard deviations and that consists of calculating a first current average of said first standard deviations and a second current average of said second standard deviations, and
    a diagnostic step that aims to calculate a first variation between the first current average and the first reference average and a second variation between the second current average and the second reference average and that aims to analyze said calculated variations in order to detect a possible relative unbalance of said wheels.

2. The method for monitoring the balancing of the wheels as claimed in claim 1, wherein each theoretical acceleration signal, of said wheels is modeled during the modeling phase by the following function:

$$f(t)=A(\sin(\omega t+\varphi))$$

where A is a constant that determines the amplitude of the theoretical acceleration signal, of the wheel in question, $\omega$ is the measured angular velocity of the wheel in question such that $\omega=2*\pi*f$ and $\varphi$ is the phase of the theoretical acceleration signal, of the wheel in question.

3. The method for monitoring the balancing of the wheels as claimed in claim 1, wherein the noise-measuring step comprises an adjustment phase that consists of adjusting the phase of the first theoretical acceleration signal to the phase of the first raw acceleration signal and of adjusting the phase of the second theoretical acceleration signal to the phase of the second raw acceleration signal in order to minimize the first standard deviations and the second standard deviations, respectively.

4. The method for monitoring the balancing of the wheels as claimed in claim 1, wherein the noise-measuring step comprises a transmission phase, during which the first standard deviation and the second standard deviation are transmitted from the first wheel unit and the second wheel unit, respectively, to a central processing unit that is fitted on the motor vehicle.

5. The method for monitoring the balancing of the wheels as claimed in claim 1, wherein the first current average and the second current average are calculated over a minimum number of first standard deviations and of second standard deviations and over a sliding window that encompasses the last standard deviations measured.

6. The method for monitoring the balancing of the wheels as claimed in claim 1, wherein the first reference average and the second reference average are calculated over a minimum number of first standard deviations and of second standard deviations.

7. The method for monitoring the balancing of the wheels as claimed in claim 1, wherein, during the diagnostic step, the first reference average of said first standard deviations and the second reference average of said second standard deviations are each reset and the first step of calculating reference averages is executed again if the following conditions are met:

the first variation involving the first wheel is greater than an upper threshold, and the second variation involving the second wheel is greater than an upper threshold.

8. The method for monitoring the balancing of the wheels as claimed in claim 1, wherein, during the diagnostic step, if either the first variation involving the first wheel or the second variation involving the second wheel is greater than an upper threshold, and if either the first variation or the second variation is lower than a lower threshold, then a warning signaling an unbalance of the wheel that has exceeded said upper threshold is output.

9. The method for monitoring the balancing of the wheels as claimed in claim 8, wherein the upper variation threshold is equal to ten percent and the lower variation threshold is equal to five percent.

10. The method for monitoring the balancing of the wheels as claimed in any one of the preceding claims, characterized in that claim 1, wherein the first wheel and the second wheel belong to one and the same axle of the motor vehicle.

11. A motor vehicle, comprising:

a first wheel unit that is mounted on an associated first wheel of the vehicle and that comprises a first computer and a first accelerometer, the first wheel unit being designed to supply a first raw acceleration signal comprising a plurality of first samples of acceleration values of the first wheel, a second wheel unit that is mounted on an associated second wheel of the vehicle and that comprises a second computer and a second accelerometer, the second wheel unit being designed to supply a second raw acceleration signal comprising a plurality of second samples of acceleration values of the second wheel, and a central unit, wherein said central unit and/or said wheel units are suitably programmed to implement the method as claimed in claim 1.

* * * * *